United States Patent Office 2,740,498
Patented Apr. 3, 1956

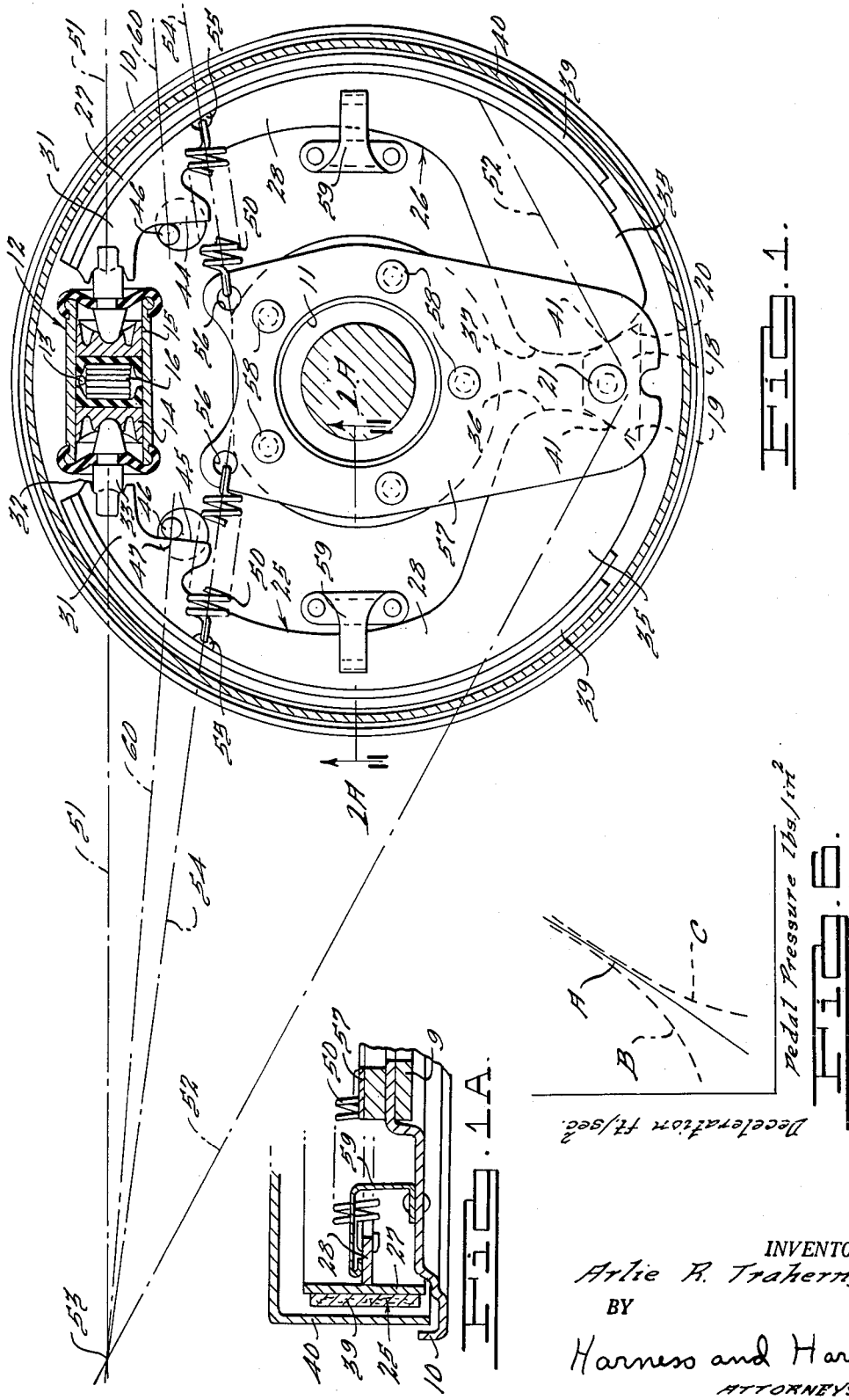

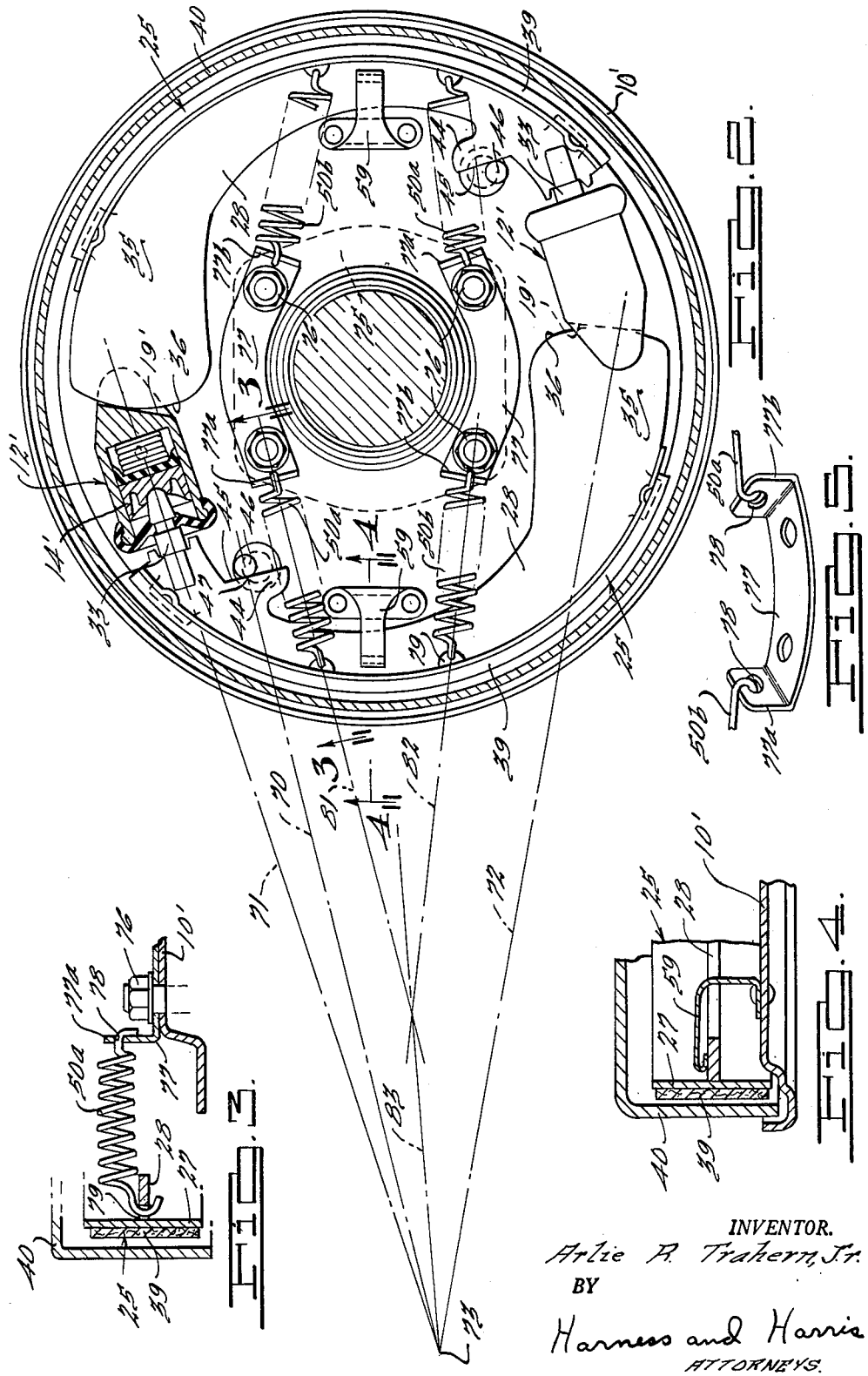

2,740,498

FLOATING SHOE BRAKE

Arlie R. Trahern, Jr., Grosse Pointe Woods, Mich., assignor to Chrysler Corporation, Highland Park, Mich., a corporation of Delaware Application November 16, 1951, Serial No. 256,706

9 Claims. (Cl. 188—78)

This invention relates to so-called "floating shoe" brake assemblies including the "sliding anchor" type of brake assembly and particularly to the arrangement of the brake shoe return springs in brake assemblies of the aforementioned types.

It is a primary object of this invention to arrange the brake shoe return springs in so-called "floating shoe" brake assemblies such that the return springs will not exert forces on the brake shoes that would tend to alter the predetermined desired manner of movement of the shoes whereby equal unit braking pressures are obtained along the shoes during all braking.

It is a further object of this invention to provide an arrangement of brake shoe return springs in a so-called "floating shoe" or "sliding anchor" brake assembly whereby the shoe return springs will not exert forces on the shoes during braking actuation thereof that will alter the predetermined initial rolling of the brake shoes into drum engagement.

It is still another object of this invention to provide an arrangement of brake shoe return springs in a so-called "floating shoe" brake assembly whereby the shoe return springs will not exert forces on the brake shoes during drum engaging movement thereof that will interfere with or alter either the initial rolling of the shoes into engagement with the brake drum or the subsequent substantially radially directed sliding movement of the shoe heel portions along the heel engaged surfaces of the brake shoe anchor members as the braking forces are increased.

It is still another object of this invention to provide an arrangement of brake shoe return springs in a so-called "floating shoe" brake assembly whereby the shoe return springs will not exert forces on the brake shoes that will tend to cause any relative sliding between the shoe heel portions and the heel engaged surfaces of the shoe anchor members during either shoe expanding or shoe retracting movement.

It is still another object of this invention to provide an arrangement of brake shoe return springs and brake shoe drum clearance adjusting means in a so-called "floating shoe" brake assembly wherein both the shoe return springs and the shoe adjusting means are located so as to prevent the development of forces on the brake shoes other than forces that might cause rolling movement of the shoes about their respective anchor member contact points.

It is still another object of this invention to arrange the eccentrically mounted brake shoe clearance adjusting means of a "floating shoe" brake assembly such that it will not cause relative sliding between the associated brake shoe heel portion and the shoe anchor member when the shoe is engaged with the clearance adjusting means in shoe retracted position.

Other objects and advantages of this invention will become readily apparent from a review of the following description thereof and a consideration of the drawings relating thereto wherein:

Fig. 1 is a side elevational view, partly in section, of a brake assembly embodying one form of this invention, this particular brake assembly being primarily adapted for the rear wheels of a rear drive motor vehicle or the like;

Fig. 1A is a sectional elevational view taken along the line 1A—1A of Fig. 1;

Fig. 2 is a side elevational view, partly in section, of a brake assembly embodying another form of this invention, this particular brake assembly comprising two leading shoes and being primarily adapted for the front wheels of a rear drive motor vehicle or the like;

Fig. 3 is a sectional elevational view taken along the line 3—3 of Fig. 2 showing the ararngement of one of the brake shoe return springs in the Fig. 2 brake assembly;

Fig. 4 is a sectional elevational view taken along the line 4—4 of Fig. 2 showing the arrangement of a brake shoe centering spring in the Fig. 2 brake assembly.

Fig. 5 is a perspective view of one of the brake shoe return spring anchor brackets utilized in the brake assembly shown in Fig. 2; and Fig. 6 is a graph that demonstrates the advantages obtained with application of this invention to "floating shoe" brakes over conventional brake shoe return spring arrangements that provide uncontrolled brake drum engaging movement.

Fig. 1 of the drawings discloses a "floating shoe" brake assembly comprising an annular support or backing plate 10 having a wheel axle receiving opening 11 at the center thereof. Plate 10, that is adapted to be rigidly mounted on an axle carrier 9 or the like, has a brake shoe actuating wheel cylinder 12 mounted thereon adjacent a peripheral portion thereof. Wheel cylinder 12 is of the opposed piston type wherein pressurized fluid is admitted to the centrally located portion of the cylinder bore 16 through an inlet port 13. Admission of pressurized fluid to the bore 16 forces the opposed pistons 14 and 15 apart so as to provide the brake shoe applying force.

Mounted on the backing plate 10, in diametrically opposed relation to the wheel cylinder 12, is a brake shoe anchor member 18. Anchor member 18 comprises a block of rigid material of more or less trapezoidal peripheral configuration having symmetrically arranged, opposed sides or ramp surfaces 19 and 20 that are substantially flat and smooth and converge towards the center of the backing plate 10. The anchor member 18 is fixedly connected to the backing plate 10 by the rivet connector 21.

Extending between each of the wheel cylinder pistons 14, 15 and one of the ramp surfaces 19 or 20 of the anchor member 18 is an arcuately shaped brake shoe 25 or 26. Brake shoes 25 and 26 are identical in construction and for that reason only shoe 25 will be specifically described. From Fig. 1A it is apparent that the brake shoe 25 is of substantially T-shaped cross sectional configuration and is composed of an arcuately formed, striplike, rim portion 27 and a flat, arcuate shaped, web portion 28 that extends normal to the rim portion 26 along the longitudinally extending center line thereof. The toe portion 31 of the brake shoe 25 has the end edge 32 thereof connected to the wheel cylinder 14 through a thrust transmitting link 33. The heel portion 35 of brake shoe 25 has the end edge 36 thereof formed as an arcuate surface adapted for rolling, as well as sliding movement, along the ramp surface 19 of the anchor member 18. The outer surface of the brake shoe rim portion 27 is covered for the most part of its length with a friction lining 39.

Extending concentrically about the line rims 27 of the brake shoes 25, 26 is a brake drum flange portion 40. On brake application pressurized fluid admitted to the wheel cylinder bore 16 forces the pistons 14, 15 apart and this piston motion rolls or rotates the heel ends 36, 37 of shoes 25, 26 along the ramp surfaces 19, 20 of the anchor member 18 until the lined rims 27 of the shoes 25, 26 engage the inner surface of the drum flange 40 along the full length of the linings 39. Thereafter some sliding movement of the shoe heel portion end edges 36, 37 along the anchor ramp surfaces 19, 20 may occur as the drum flange 40 and the lined shoe rims 27 automatically adjust themselves to each other during braking engagement. As the drum flange 40 and the shoes 25, 26 are usually of such materials and design as to be somewhat elastic and flexible, there will be minute changes in configuration of the concentrically arranged, engaged elements 40, 27 during brake application. These changes in configuration and the accompanying shift of the shoe heel edges 36, 37 along the ramps 19, 20 insure contact of the linings 39 with the inner surface of drum 40 throughout the entire exposed area of the shoe linings 39. This gives maximum braking with minimum unit lining pressures and insures the best brake with the least amount of, as well as uniform, shoe lining wear.

The inner edges of the shoe webs 28, adjacent the toe portions 31, are each formed with a co-planar, inwardly extending finger 44 having an edge surface 45 that is adapted to be engaged by an eccentrically mounted, rotatable pin 46. Rotation of the mounting for pin 46 will provide for adjustment of the clearance between the shoe linings 39 and the inner surface of the drum flange 40 when the brake shoes are in brake released or retracted positions. The location of the pins 46 and their points of contact 47 with the finger edge surfaces 45 is based upon the same geometry used in locating the return springs for the brake shoe mounting as will be more clearly brought out in the subsequent description.

One of the basic features of this invention involves the specific location of the brake shoe return springs 50 with relation to the geometry of the other brake shoe supporting elements. It will be noted that the line of action of the wheel cylinder piston 14 relative to the brake shoe 25 is along the line 51. Also, it will be noted that the line of reaction between anchor member 18 and the heel portion 35 of the shoe 25 is along the line 52 that is normal to the anchor block ramp surface 19 at the contact point 41. The lines of action and reaction 51, 52 for shoe 25 intersect at a point 53. It has been established that improved brakes of the "floating shoe" type are achieved if the brake shoe return springs are positioned such that they do not interfere with the normal rolling drum engaging movement of the shoe heels 36, 37 along the anchor block ramp surfaces 19, 20. Each brake shoe return spring 50 is so located in this brake assembly that its line of action 54 intersects the point of intersection 53 of the lines of force 51, 52 for the respective brake shoes 25, 26.

Return springs 50 are each connected by their hook-like ends between openings 55 in the shoe webs 27 and openings 56 in a plate 57 that is mounted on the central portion of the backing plate 10. Rivet-like connectors 58 fixedly mount the spring anchor plate 57 on the backing plate 10. As the shoe anchor member 18 is positioned between the plates 10 and 57, it is obvious that the heel portions 35 of the brake shoes 25, 26 are sandwiched between the plates 10 and 57 so as to be guidingly retained in their proper positions and prevented from tilting or cocking. A pair of J-shaped spring elements 59 may be mounted on the backing plate 10 and engaged with the webs 28 of the shoes to further assist in centering the shoes.

With the return spring arrangement herein disclosed it is thought to be apparent that on brake application the return springs 50 will exert forces along the force lines 54 and these forces will not alter the manner of rolling of the shoe heel portions 36, 37 along the anchor block ramp surfaces 19, 20 respectively. Furthermore, springs 50 will not cause any relative sliding between the shoe heel edges 36, 37 and the anchor block ramp surfaces 19, 20 during either brake shoe expansion or retraction. Accordingly, the brake shoes 25, 26 are rolled into engagement with brake drum 40 in a manner that provides drum engagement along the full length of the linings 39. This overall engagement of the linings 39 with the drum 40 results in low unit braking pressures. As the brake applying forces increase, the linings 39 on the somewhat flexible shoes 25, 26 are forced against the somewhat flexible drum flange 40 with the result that the drum flange 40 and/or the shoes 25, 26 may be deformed slightly. Notwithstanding, all areas of the linings 39 remain in frictional engagement with the drum 40 and the unit braking pressures along the linings 39 are uniform and relatively low. During the deformation of the shoes and/or the drum, the shoe heel portion end edges 36, 37 may slide along the anchor block ramp surfaces 19, 20 until they automatically adjust themselves to the change in shape of the drum flange 40 and/or shoes 25, 26.

On release of the brake applying forces the elasticity of the flexible shoes 25, 26 and/or drum 40 causes these engaged elements to first return to their more or less normal shapes or configurations with accompanying sliding of the shoe heels 36, 37 along the ramps 19, 20. Thereafter, the shoes 25, 26 return by rotative or rolling movement about the ramps 19, 20 to their normally retracted positions. As a result of the return springs 50 being positioned so as not to cause sliding of the shoe heel portions 36, 37 along the anchor block ramp surfaces 19, 20, during either brake shoe expansion or brake shoe retraction, the shoes are always positioned for initial rolling movement into drum engagement with the initial drum engagement being along all face portions of the linings. This insures a substantially noiseless, readily controllable, easily applied brake. In addition the shoes are always positioned for easy adjustment by the eccentrics 46, and the lining wear will be uniform so as to give long brake life.

In applying the principles of this invention, it has been established that the same reasoning that applied in determining the optimum location of the shoe return springs 50 is also beneficial in determining the optimum location of the shoe clearance adjusting eccentrics 46 and their engaged shoe surfaces 45. By having the surface 45 on the shoe web finger 44 project at such an angle that a normal 60 to this surface 45, through the point of contact 47 of this surface with the pin 46, passes through the intersection 53 of the action and reaction lines 51, 52, the improved geometry of the brake is maintained and the eccentric clearance adjusting pins 46 will not cause relative sliding between the heel end edges 36, 37 and the anchor block ramp surfaces 19, 20 during either brake shoe adjustment or brake shoe retraction. As the shoes are adjusted they will be rolled about their anchor block contact points 41 on the ramps 19, 20. On shoe retraction by the return springs 50, engagement of the finger surfaces 45 with pins 46 will not tend to shift the contact points 41 of the shoe heels 36, 37 with the ramps 19, 20 nor cause sliding of the shoe heels 36, 37 along the anchor block ramp surfaces 19, 20. It should be noted that the return springs 50 must be so positioned as to press the shoe heels 36, 37 against the ramp 19, 20 with such a force that when the shoes are in retracted positions the coefficient of friction between the shoe heels 36, 37 and the ramp surfaces 19, 20 will prevent movement of the shoe heels along the ramps 19, 20 by wheel vibration, gravity forces or the like. The shoes are thus maintained in their optimum location for effective braking.

While Fig. 1 shows the lines of action 51, 52, 54 and 60 of the forces applied to the shoe 25 as all passing through the single intersection point 53, it is to be understood that this is the ideal situation but that this invention is not to be so restricted but is intended to cover suitable variations wherein the several noted force lines may not all pass through the same point but all are nevertheless directed towards a relatively small common hub or central area. While a slight offset of the several force lines with relation to the common center is liable to create forces or moments that might tend to shift the shoe heel portions 36, 37 along the anchor block ramp surfaces 19, 20, still, the coefficient of friction between these engaged heel and ramp surfaces may be such as to overcome or counteract the forces or moments due to non-intersection of the several force lines applied to the shoe and thus the shoes will be continuously maintained in their ideal braking positions. It is thought to be obvious that the coefficient of friction between the engaged surfaces 36, 37 and 19, 20 respectively will vary somewhat depending on the condition of these engaged surfaces and the forces acting to hold the surfaces in engagement.

Fig. 2 shows the principles of this invention applied to a two leading shoe, "floating shoe" brake assembly. In this arrangement a pair of shoe return springs 50a and 50b are used for retracting each shoe in place of the single return spring 50 shown in the Fig. 1 form of the invention. As is characteristic of a two leading shoe brake, a pair of wheel cylinders 12' are mounted on the backing plate 10' in diametrically opposed relationship. Each wheel cylinder 12' contains a single piston 14' that is suitably connected by a link 33 to the toe end of a "floating" brake shoe 25. Each of the cup-like wheel cylinders 12' has the exterior side of the closed end thereof formed with a ramp surface 19'. Each ramp surface 19' is adapted to provide a ramp seat for the arcuate end edge 36 of the heel end portion 35 of the brake shoe web 28. The ramp surfaces 19' are substantially radially extending although in the form shown they do not actually radiate from the center of the annular backing plate 10'.

Brake shoes 25 of Fig. 2 are of the same general type as those shown in Fig. 1 so only the differences between the Fig. 1 and Fig. 2 shoes will be specifically described. The heel end edges 36 of the shoe webs 28 are adapted to roll along the anchor ramps 19' and are also free to slide along the ramp surfaces 19' the same as was the case with the Fig. 1 shoes. Each shoe 25 in Fig. 2 has converging lines of action and reaction 71, and 72 respectively that intersect at 73. The shoe clearance adjusting means 44—47 for each shoe is identical to that shown in Fig. 1 and these adjusting means are each positioned such that the line of action 70 through the pin 46 is arranged to pass through or come close to the aforementioned intersection point 73. Shoe centering springs 59 are utilized in the Fig. 2 form of the invention just as in the Fig. 1 form. Backing plate 10', which also provides a dust and dirt shield for the brake assembly, is rigidly mounted on a steering knuckle support 75 or the like by means of the bolt type connectors 76. Connectors 76 also mount a pair of strip-type return spring anchor brackets 77 on the backing plate 10'. The return spring anchor brackets 77 (see Fig. 5) each have upturned ends 77a and 77b with apertures 78 therein each of which is adapted to receive a hook-like end of one of the brake shoe return springs 50a or 50b. The hook-like ends of the shoe return springs 50a and 50b, that are opposite the ends connected to the brackets 77, are connected to the associated brake shoe web portion 28 as a result of being threaded through openings 79 in the shoe web portions 28.

As was the case with the Fig. 1 form of the invention, the shoe return springs 50a and 50b in the Fig. 2 brake assembly are arranged such that their lines of action 81 and 82 respectively have a resultant line of action 83 that extends through, or at least passes close to, the point of intersection 73 of the aforementioned action and reaction lines 71, 72 respectively. If the resultant line of action or force 83 of the double shoe return springs 50a and 50b passes through intersection point 73, it is thought to be apparent from the preceding description of the Fig. 1 form of the invention, that the double return springs 50a and 50b for the shoes 25 in Fig. 2 will function in the substantially same manner as the single return spring 50 of Fig. 1. Accordingly, return springs 50a, 50b will not alter the initial rolling of the shoes 25 into engagement with the brake drum 40 so as to insure shoe engagement with the drum along the full length of the linings 39. Furthermore, springs 50a, 50b will not cause relative sliding of the heel edges 36 along ramps 19' during either brake shoe expansion or retraction. As a result of the improved shoe actuation achieved with the described shoe return spring arrangement, a marked improvement in brake effectiveness and operability is obtained as well as improved lining life.

Fig. 6 of the drawings is a graph having brake induced deceleration plotted against the brake applying force or what is often referred to as the "pedal pressure." Curve A represents the curve that would be obtained when this invention is applied to a vehicle "floating shoe" brake assembly. Curve B is the curve that would be obtained when the shoe return springs of a "floating shoe" brake assembly are so positioned that they cause initial shoe and drum engagement along the toe portions of the brake shoes during light pedal pressure brake application. Curve C is the curve that would be obtained when the shoe return springs of a "floating shoe" brake assembly are so positioned that they cause initial shoe and drum engagement along the heel portions of the brake shoes during light pedal pressure brake application. It has been found that brakes having the characteristics of either curves B or C are often subject to undue noise and are hard to adjust. Also, brakes of the curve B type are often vicious in their manner of operation whereas brakes of the curve C type are often poor in performance at low pedal pressures and give a more or less spongy or ineffective sensation to the operator.

I claim:

1. In a brake assembly comprising a support, a rotatable annular brake drum encircling said support, a unitary brake shoe movably mounted on said support having arcuate portions concentrically arranged within said drum adapted to be moved outwardly into engagement with arcuate portions of said drum, shoe actuating means mounted on said support and connected to a first portion of said brake shoe arranged to provide a shoe expanding force acting along a first line adapted to effect engagement of said brake shoe arcuate portions with said drum arcuate portions, ramp means on said support connecting a second portion of said brake shoe to said support so as to permit sliding and/or rolling movement of said second portion of said shoe on said ramp means, said last-mentioned ramp means providing the means for applying the braking reaction of the shoe to the support, the reaction force of said shoe on said ramp means acting along a second line that intersects said first line, and a resilient brake shoe retracting means connected between said support and said brake shoe arranged to exert a shoe retracting force that acts along a line that extends so close to the intersection of said first and second lines of force that said resilient shoe retracting means will be prevented from exerting a force on said shoe during expansion and retraction thereof that will cause relative movement between said second portion of the shoe and said ramp means, said point of intersection being located in substantially the immediate vicinity of the brake assembly.

2. In a brake assembly comprising a support, a rotatable annular brake drum encircling said support, a brake shoe floatingly mounted on said support having arcuate portions concentrically arranged within said drum adapted to be moved outwardly into engagement with arcuate portions of said drum, shoe actuating means mounted on said support and connected to a first portion of said brake shoe arranged to provide a brake shoe expanding force acting along a first line adapted to effect engagement of said brake shoe arcuate portions with said drum arcuate portions, ramp means connecting a second portion of said brake shoe to said support so as to permit rolling and/or sliding movement of said second portion of said shoe relative to said support, said last-mentioned ramp means providing the means for applying the braking reaction of the shoe to the support, the reaction force acting along a second line that intersects said first line, and a pair of resilient shoe retracting elements connected between said support and said shoe arranged such that the resultant line of force of said resilient elements substantially passes so close to the intersection of said first and second lines of force that said resilient shoe retracting elements will be prevented from exerting a force on said shoe during actuation thereof that will cause relative movement between said second portion of said shoe and said support, said point of intersection being located in substantially the immediate vicinity of the brake assembly.

3. In a brake assembly comprising a support, a rotatable annular brake drum encircling said support, a unitary brake shoe floatingly mounted on said support having arcuate portions concentrically arranged within said drum adapted to be moved outwardly into engagement with arcuate portions of said drum, shoe actuating means mounted on said support and connected to a first portion of said brake shoe arranged to provide a force acting along a first line adapted to effect engagement of said brake shoe arcuate portions with said drum arcuate portions, ramp means connecting a second portion of said brake shoe to said support so as to permit rolling and/or sliding movement of said second portion of said shoe along said ramp means, said last-mentioned ramp means providing the means for applying the braking reaction of the shoe to the support, the reaction force acting along a second line that intersects said first line, a resilient brake shoe retracting means connected between said support and said brake shoe arranged to exert a shoe retracting force that acts along a line that passes through the point of intersection of said first and second lines of force, and a drum clearance adjusting means for said shoe comprising stop means movably mounted on said support and engageable with portions of said shoe so as to provide a third line of force acting on said shoe that passes through the point of intersection of the first and second lines of force, said line of force of said brake shoe retracting means being so arranged that it is prevented from exerting a force on the second portion of the brake shoe that would cause said shoe second portion to move along said ramp means and said point of intersection being in substantially the immediate vicinity of said brake assembly.

4. In a brake assembly comprising a support, a rotatable annular brake drum encircling said support, a unitary brake shoe floatingly mounted on said support having arcuate portions concentrically arranged within said drum adapted to be moved outwardly into engagement with arcuate portions of said drum, shoe actuating means mounted on said support and connected to a first portion of said brake shoe arranged to provide a force acting along a first line adapted to effect engagement of said brake shoe arcuate portions with said drum arcuate portions, ramp means connecting a second portion of said brake shoe to said support so as to permit sliding and/or rolling movement of said second portion of said shoe along said ramp means, said last-mentioned ramp means providing the means for applying the braking reaction of the shoe to the support, the shoe reaction force acting along a second line that intersects said first line, a resilient brake shoe retracting means connected between said support and said brake shoe arranged to exert a shoe retracting force that acts along a line that passes through the point of intersection of said first and second lines of force, and a drum clearance adjusting means for said shoe comprising stop means movably mounted on said support and engageable with portions of said shoe so as to provide a third line of force acting on said shoe that passes so close to said point of intersection of said first and second lines of force that said drum clearance adjusting means for said shoe will be prevented from exerting a force on said shoe that will cause said second portion of said shoe to slide relative to said ramp means, said line of force of said brake shoe retracting means being so arranged that it is prevented from exerting a force on the second portion of the brake shoe that would cause said shoe second portion to move along said ramp means and said point of intersection being in substantially the immediate vicinity of said brake assembly.

5. In a floating shoe brake assembly, a support, an annular brake drum rotatably mounted on said support, a wheel cylinder mounted on said support and arranged within said brake drum, said cylinder having a movable pressure fluid operated motion transmitting means adapted to exert a first line of force extending in a direction towards said drum, an anchor member mounted on said support within said drum and spaced circumferentially of said drum from said wheel cylinder, said anchor member having a ramp surface extending at an angle to the direction of said first line of force, an arcuately shaped unitary brake shoe arranged concentrically within said brake drum and adapted for engagement therewith having a toe portion positively connected to said wheel cylinder motion transmitting means for movement thereby and a heel portion seated on said anchor member ramp surface for rolling and sliding movement therealong, said ramp surface providing the reaction member for said shoe and acting to provide a second shoe applied line of force extending in a second direction towards said drum and directed such that it intersects said first line of force, and a stressed resilient means connected between said support and a portion of said shoe intermediate the toe and heel portions thereof, said resilient means providing a third line of force applied to said shoe that substantially intersects the point of intersection of said first and second lines of force and is arranged such that it is prevented from exerting a force on said shoe that would cause the ramp engaged heel portion of the shoe to move along said ramp surface, and said point of intersection being in the immediate vicinity of the brake assembly.

6. In a floating shoe brake assembly, a support, an annular brake drum rotatably mounted on said support, an actuating means mounted on said support and arranged within said brake drum, said actuating means having motion transmitting means adapted to exert a first line of force extending in a direction towards said drum, an anchor member mounted on said support within said drum and spaced circumferentially of said drum from said actuating drum, said anchor member having a ramp surface extending at an angle to the direction of said first line of force, an arcuately shaped unitary brake shoe arranged concentrically within said brake drum and adapted for engagement therewith having a toe portion positively connected to said motion transmitting means for movement thereby and a heel portion seated on said anchor member ramp surface for sliding and rolling movement therealong, said ramp surface providing the reaction member for said shoe and acting to provide a second shoe applied line of force extending in a second direction towards said drum and directed such that it intersects said first line of force, and a resilient means connected between said support and said shoe, said resilient means providing a third line of force applied to said shoe that substantially intersects the point of intersection of said first and second lines of force and is arranged such that it is prevented from exerting a force on said shoe that would cause the ramp engaged heel portion of the shoe to move along said ramp surface, and said point of intersection being in the immediate vicinity of the brake assembly.

7. In a floating shoe brake assembly, a support, an annular brake drum rotatably mounted on said support, an actuating means mounted on said support and arranged within said brake drum, said actuating means having motion transmitting means adapted to exert a first line of force extending in a direction towards said drum, an anchor member mounted on said support within said drum and spaced circumferentially of said drum from said actuating means, said anchor member having a ramp surface extending at an angle to the direction of said first line of force, an arcuately shaped unitary brake shoe arranged concentrically within said brake drum and adapted for engagement therewith having a toe portion positively connected to said motion transmitting means for movement thereby and a heel portion seated on said anchor member ramp surface for sliding and rolling movement therealong, said ramp surface providing the reaction member for said shoe and acting to provide a second shoe applied line of force extending in a second direction towards said drum and directed such that it intersects said first line of force, a resilient means connected between said support and said shoe, said resilient means providing a third line of force applied to said shoe that substantially intersects the point of intersection of said first and second lines of force, and a drum clearance adjusting means for said shoe comprising stop means movably mounted on said support and engageable with portions of said shoe so as to provide a fourth line of force applicable to said shoe that is directed such that it substantially intersects the point of intersection of said first and second lines of force, said resilient means being so arranged that it is prevented from exerting a force on said shoe that would cause the shoe heel portion to move along the ramp surface.

8. In a floating shoe brake assembly, a support, an annular brake drum rotatably mounted on said support, a wheel cylinder mounted on said support and arranged within said brake drum, said cylinder having a movable pressure fluid operated motion transmitting means mounted therein and adapted to exert a first line of force extending in a direction towards said drum, an anchor member mounted on said support within said drum and spaced circumferentially of said drum from said wheel cylinder, said anchor member having a substantially radially directed ramp surface extending at an angle to the direction of said first line of force, an arcuately shaped unitary brake shoe arranged concentrically within said brake drum, said shoe being of T-shaped cross sectional configuration and comprising a web element and a peripherally disposed rim element, said web element having the toe portion thereof positively connected to said wheel cylinder motion transmitting means for movement thereby and the heel portion end edge thereof formed with an arcuate contour that is seated on said anchor member ramp surface for rolling and sliding movement therealong, said ramp surface providing the reaction member for said shoe and acting to provide a second shoe applied line of force extending in a second direction towards said drum and directed such that it intersects said first line of force, and a resilient means connected between said support and a portion of said shoe web element intermediate the toe and heel portions thereof, said resilient means providing a third line of force applied to said shoe that substantially intersects the point of intersection of said first and second lines of force and is arranged such that it is prevented from exerting a force on said shoe that would cause the ramp engaged heel portion of the shoe to move along said ramp surface, and said point of intersection being in the immediate vicinity of the brake assembly.

9. In a floating shoe brake assembly, a support, an annular brake drum rotatably mounted on said support, a first wheel cylinder mounted on said support and arranged within said brake drum, said cylinder having a movable pressure fluid operated motion transmitting means mounted therein and adapted to exert a first line of force extending in a direction towards said drum, and a second wheel cylinder mounted on said support within said drum and spaced circumferentially of said drum from said first wheel cylinder, said second wheel cylinder having a slot formed in an exteriorly disposed end surface thereof providing a substantially radially directed ramp surface extending at an angle to the direction of said first line of force, an arcuately shaped brake shoe arranged concentrically within said brake drum, said shoe being of T-shaped cross sectional configuration and comprising a web element and a peripherally disposed rim element, said web element having a toe portion positively connected to said wheel cylinder motion transmitting means for movement thereby and a heel portion end edge thereof formed with an arcuate contour that is seated on the slot in said second wheel cylinder for rolling and sliding movement along the ramp surface thereof, said ramp surface providing the reaction member for said shoe and acting to provide a second shoe applied line of force extending in a second direction towards said drum and directed such that it intersects said first line of force, and a resilient means connected between said support and a portion of said shoe web element intermediate the toe and heel portions thereof, said resilient means providing a third line of force that substantially intersects the point of intersection of said first and second lines of force and is arranged such that it is prevented from exerting a force on said shoe that would cause the ramp engaged heel portion of the shoe to move along said ramp surface, and said point of intersection being in the immediate vicinity of the brake assembly.

References Cited in the file of this patent

UNITED STATES PATENTS

| 2,206,030 | Dick | July 2, 1940 |
| 2,218,201 | Lapwood | Oct. 15, 1940 |
| 2,544,030 | House | Mar. 6, 1951 |
| 2,595,143 | House | Apr. 29, 1952 |

FOREIGN PATENTS

| 737,914 | France | Oct. 10, 1932 |
| 823,894 | France | Oct. 25, 1937 |